April 12, 1927.  
H. N. HALVERSEN  
1,624,549  
MULTIPLE GRADUATING MACHINE  
Filed Oct. 15, 1924  9 Sheets-Sheet 1

INVENTOR  
Hans N. Halversen  
By Walter  
M. Fuller  
ATTORNEY

April 12, 1927.

H. N. HALVERSEN 1,624,549

MULTIPLE GRADUATING MACHINE

Filed Oct. 15, 1924   9 Sheets-Sheet 2

INVENTOR
Hans N. Halversen
By Walter M. Fuller
ATTORNEY

April 12, 1927.  H. N. HALVERSEN  1,624,549
MULTIPLE GRADUATING MACHINE
Filed Oct. 15, 1924    9 Sheets-Sheet 3
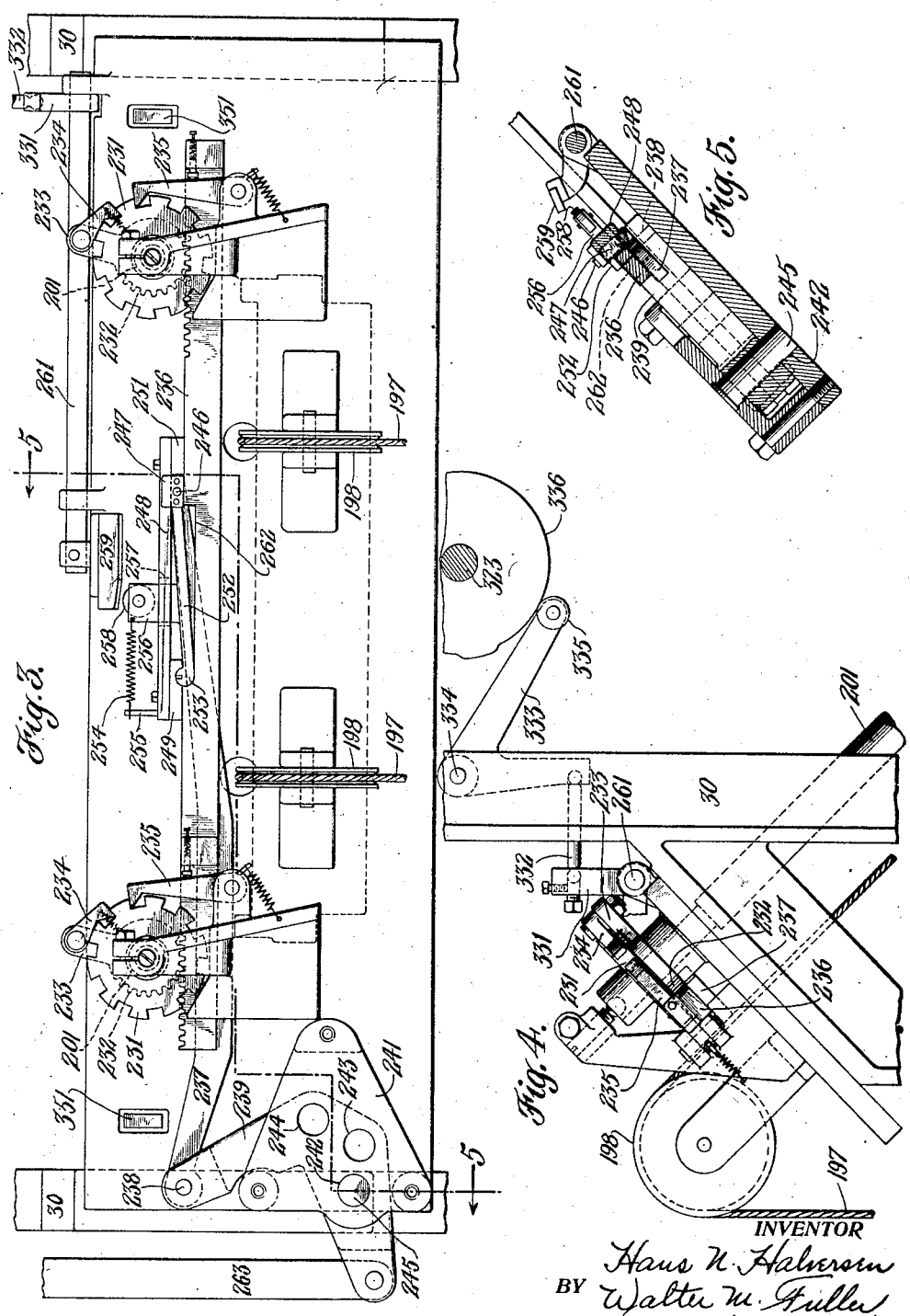
INVENTOR
Hans N. Halversen
BY Walter M. Fuller
ATTORNEY

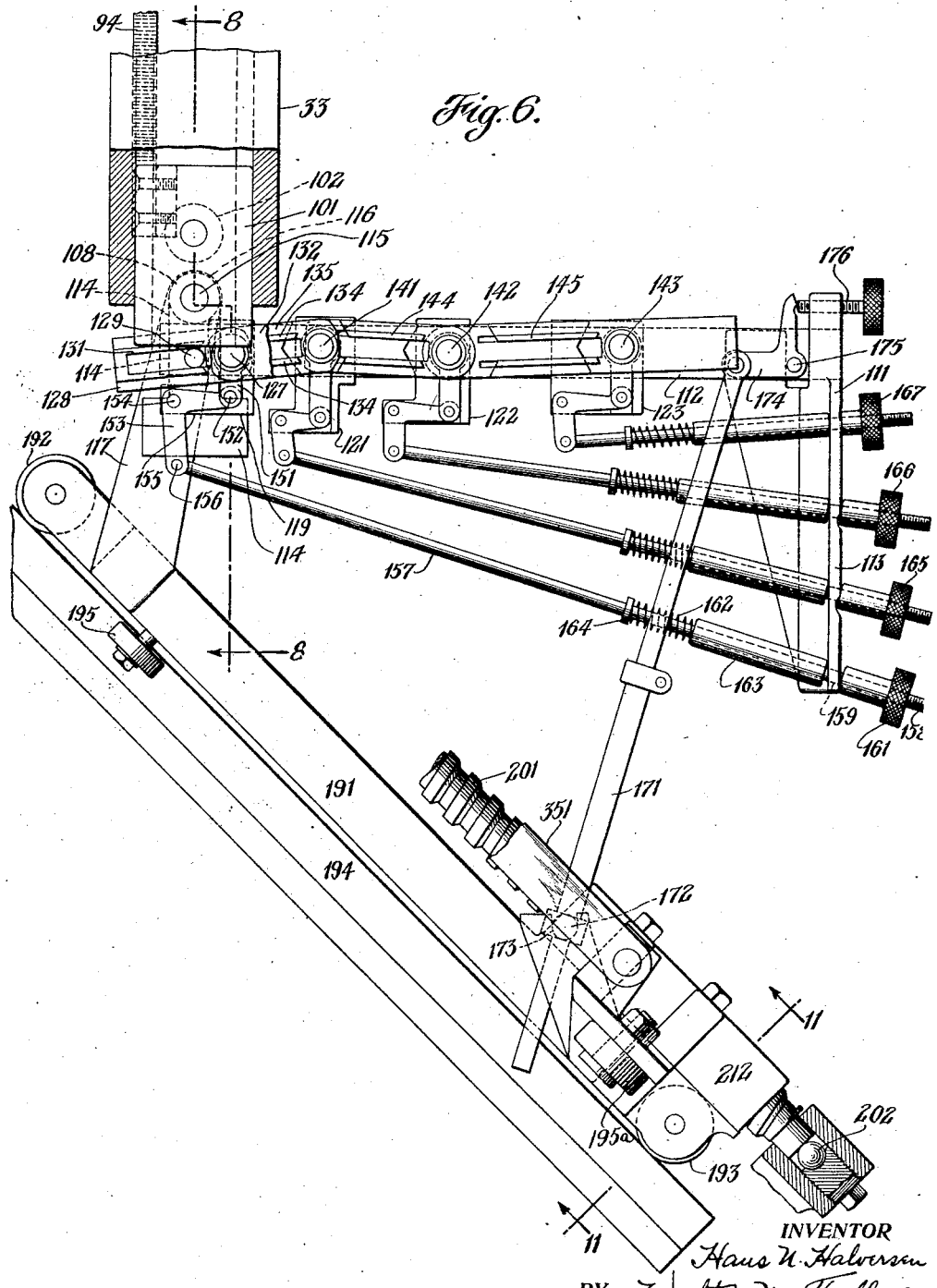

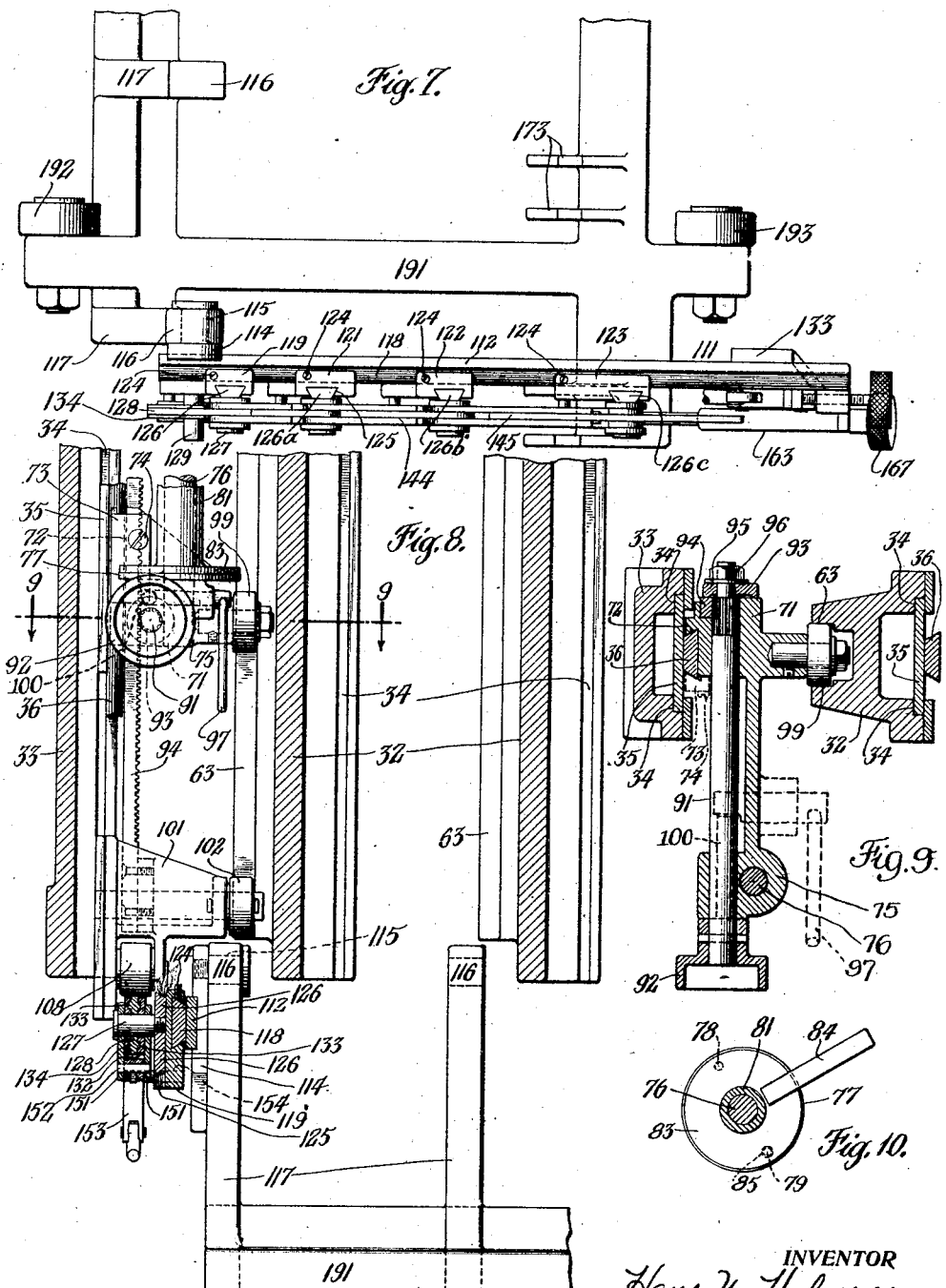

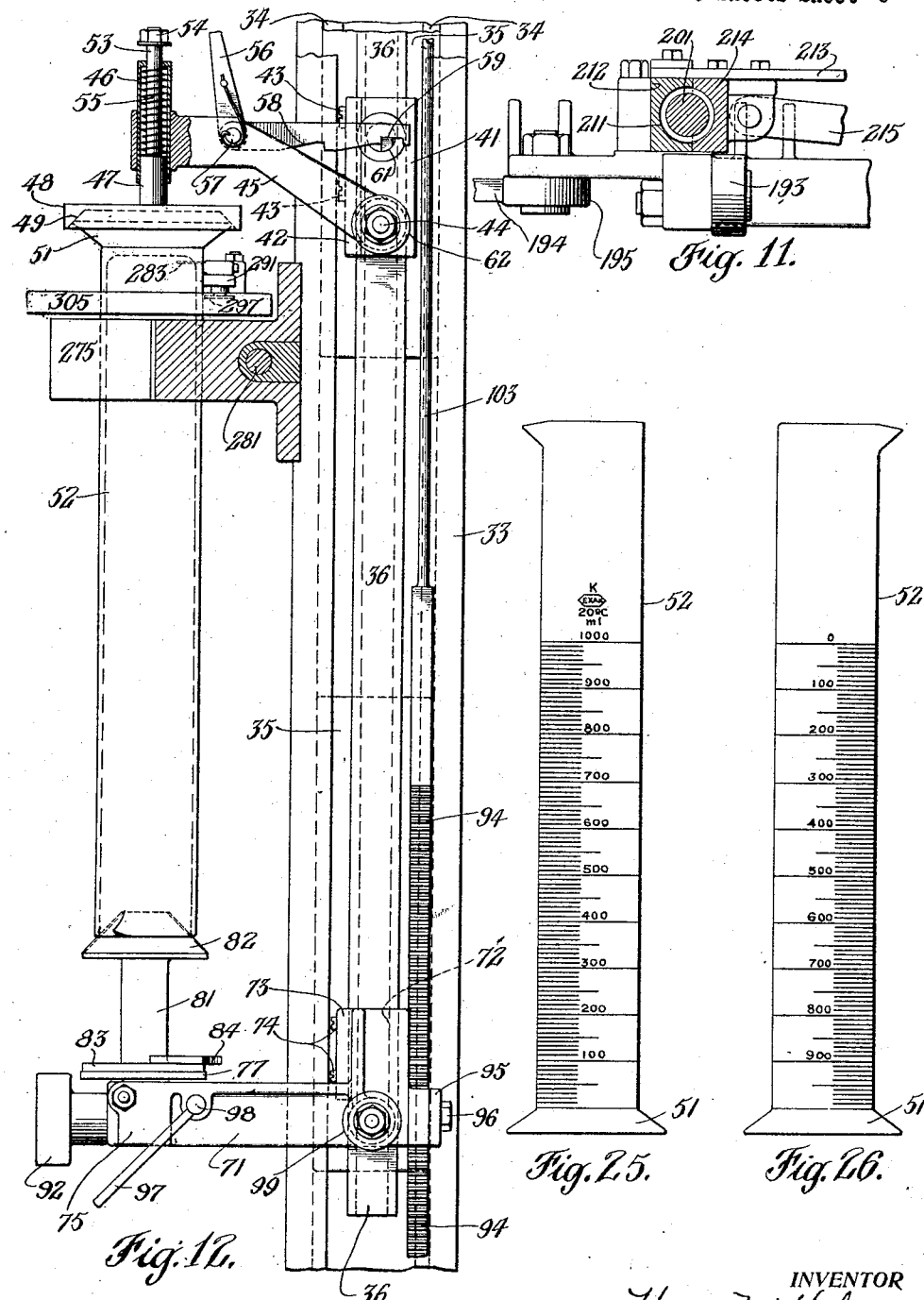

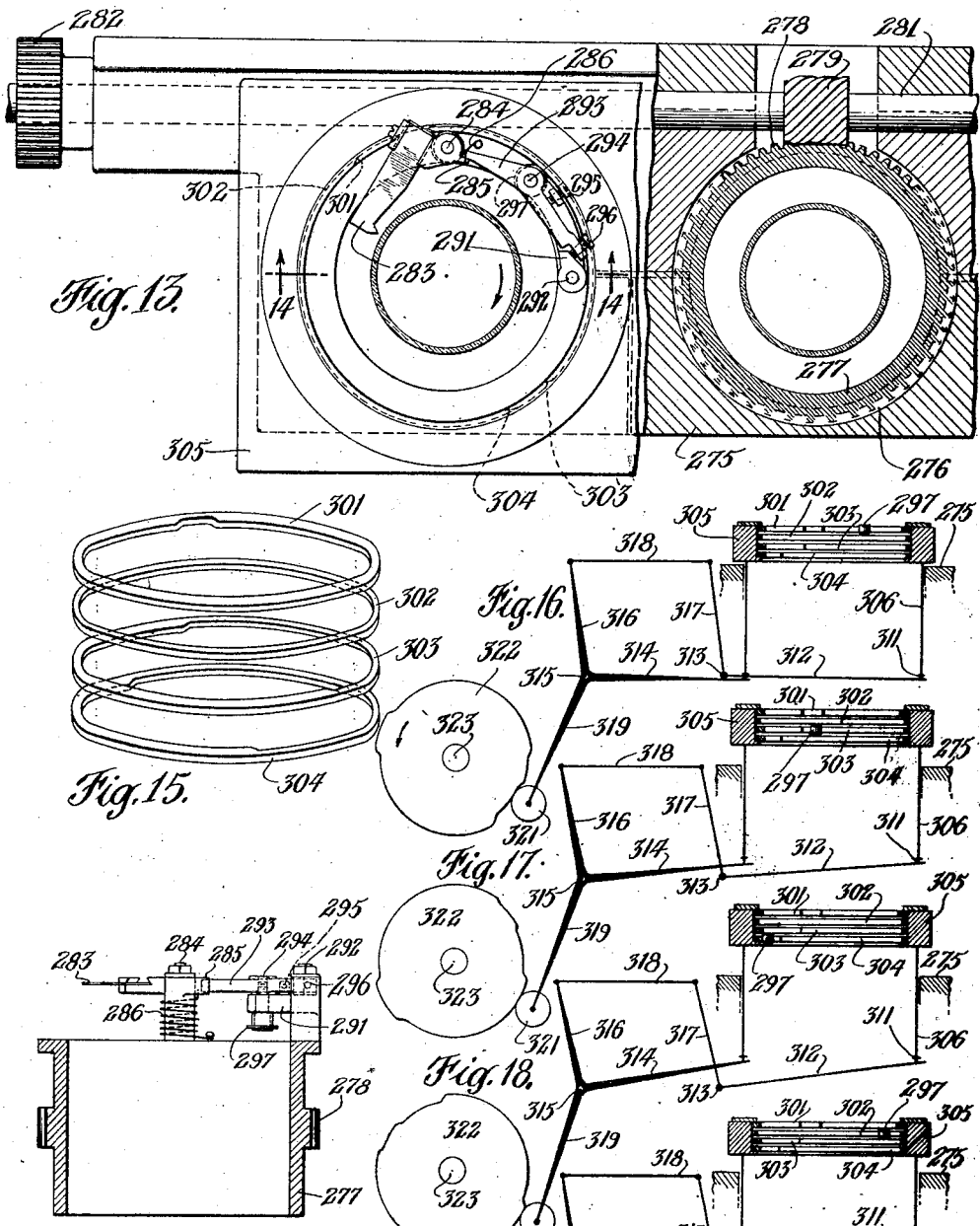

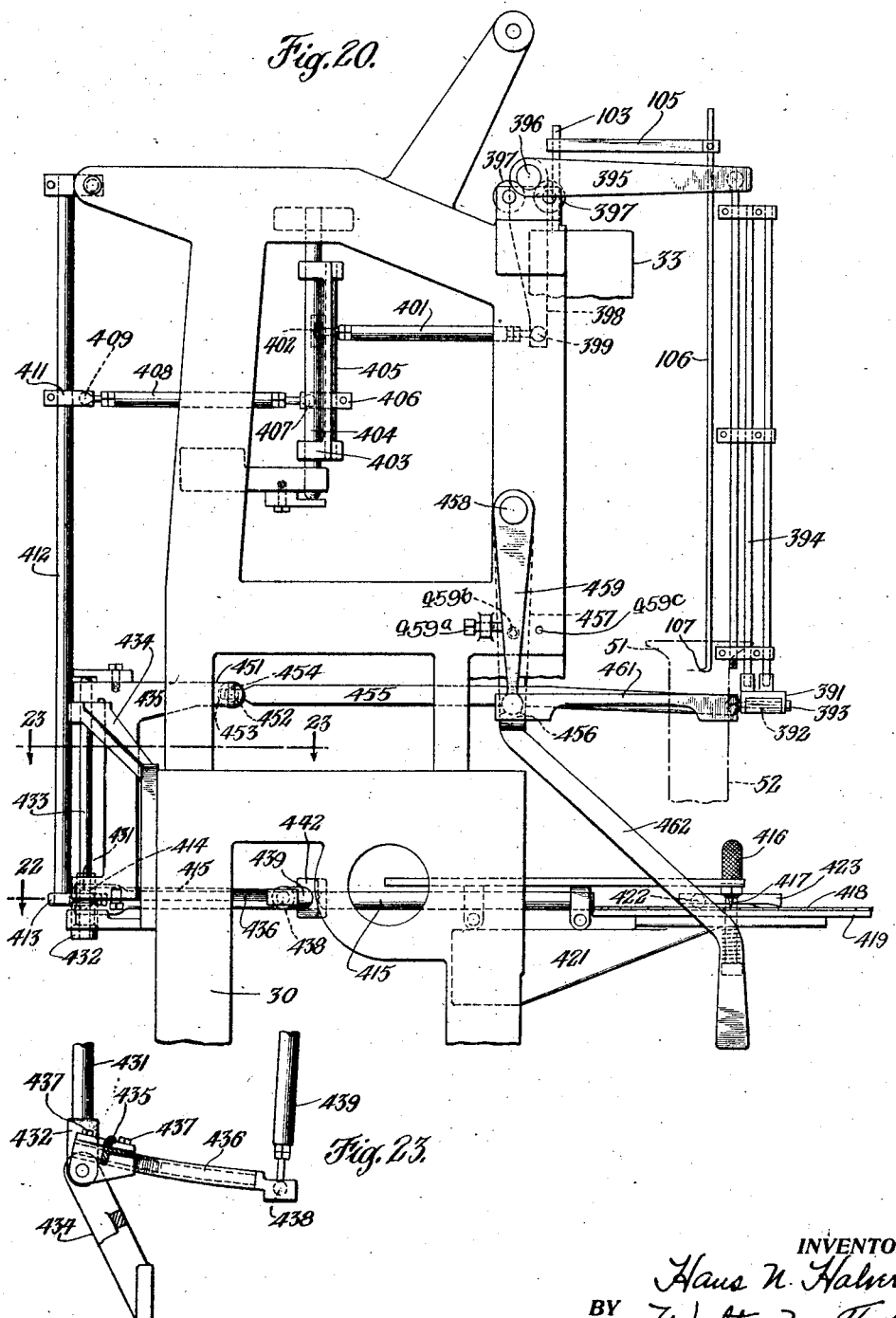

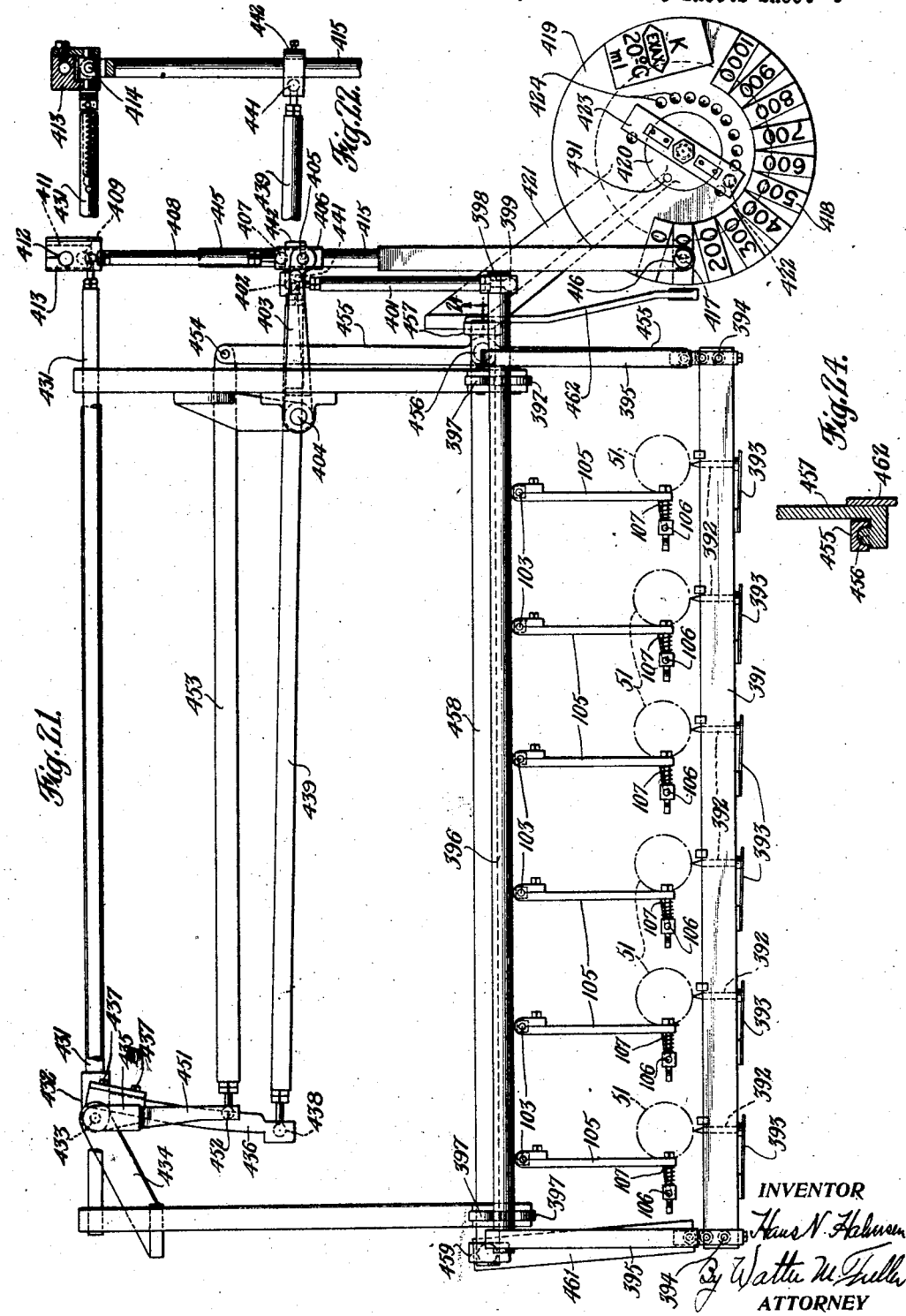

Patented Apr. 12, 1927.

1,624,549

UNITED STATES PATENT OFFICE.

HANS N. HALVERSEN, OF VINELAND, NEW JERSEY, ASSIGNOR TO KIMBLE GLASS COMPANY, OF CHICAGO, ILLINOIS, A CORPORATION OF ILLINOIS.

MULTIPLE GRADUATING MACHINE.

Application filed October 15, 1924. Serial No. 743,694.

This invention pertains to machines adapted to mark spaced graduations on a plurality of vessels or containers at the same time, and it is intended more especially, but not restrictedly, for use in appliances of this character for the graduation of glass measuring vessels, such as graduates.

The leading object, or prime aim, of the invention, which is an improvement on that of United States Patent No. 1,463,317, granted to me July 31, 1923, is the production of a machine of this character which will graduate the vessels with great accuracy and with an effective saving of time over the employment of other appliances of the same general character.

Whereas the principles of construction and modes of operation of the invention are capable of satisfactory use in a machine graduating a plurality of vessels simultaneously, some of them, nevertheless, may be separately and advantageously employed in mechanisms graduating one vessel at a time.

Another feature of the invention resides in the marking simultaneously of several vessels with figures or numerals corresponding to certain ones of the graduation lines, the preferred embodiment of the invention having means whereby such figures are subject to adjustment or variations as to size.

In order to enable those skilled in this art to have a full and complete understanding of the invention, both from structural and functional standpoints, in the accompanying drawings, forming a part of this specification, and throughout the several views of which like reference characters have been employed to designate the same elements, I have illustrated a desirable and preferred embodiment of the invention, which accomplishes the above-stated and other desirable advantages.

In these drawings:

Figure 1 is a side elevation of the improved and novel machine with certain of the parts broken away from clarity of illustration, but this view, nevertheless, indicates most of the more or less important parts of the construction. In this view some of the levers and other elements are broken away, whereas some of the other parts are indicated somewhat diagrammatically. The inclined, slidable carriage is in a position corresponding to about the tenth or twelfth graduation line.

Figure 3 is a plan view of the screw driving mechanism, which feeds the carriage, at the rear of the machine and shows the trip device which releases the screw-feeding devices to allow an idle stroke thereof during the marking of each tenth graduation line or ring around the vessel undergoing graduation.

Figure 4 is a view of the right hand end of the portion of the machine shown in Figure 3.

Figure 5 is a cross-section on the irregular line 5—5 on Figure 3.

Figure 6 is an enlarged view of one of the flexible or articulated vessel-feeding mechanisms showing the screw-fed inclined carriage in its lowermost position.

Figure 7 is a plan view of one of these jointed or flexible feeding mechanisms illustrating a portion of the carriage.

Figure 8 is a vertical section on line 8—8 on Figure 6.

Figure 9 is a horizontal section on line 9—9 on Figure 8.

Figure 10 is a sectional plan view of one of the plates and its handle for turning one of the glass vessels into its two positions for receiving its two rows of numbers, this view being taken on line 10 of Figure 1.

Figure 11 is a cross-section on line 11—11 of Figure 6.

Figure 12 is an enlarged, vertical section on line 12—12 of Figure 2.

Figure 13 is an enlarged, fragmentary, horizontal section on the irregular line 13—13 of Figure 2.

Figure 14 is a vertical section on the line 14—14 of Figure 13.

Figure 15 includes four, perspective views of the corresponding number of cams controlling the action of the graduating or marking scriber, and these cams, although illustrated as separated from one another, are in the same relative positions as when held together in their plate.

Figures 16, 17, 18 and 19 are diagrammatic views indicating the various positions which the cam-plate and its cams assume, Figure 16 illustrating the position the plate takes when the machine automatically stops, the upper cam being then in the path of the roller controlling the operation of the graduation line scriber.

Figure 1:
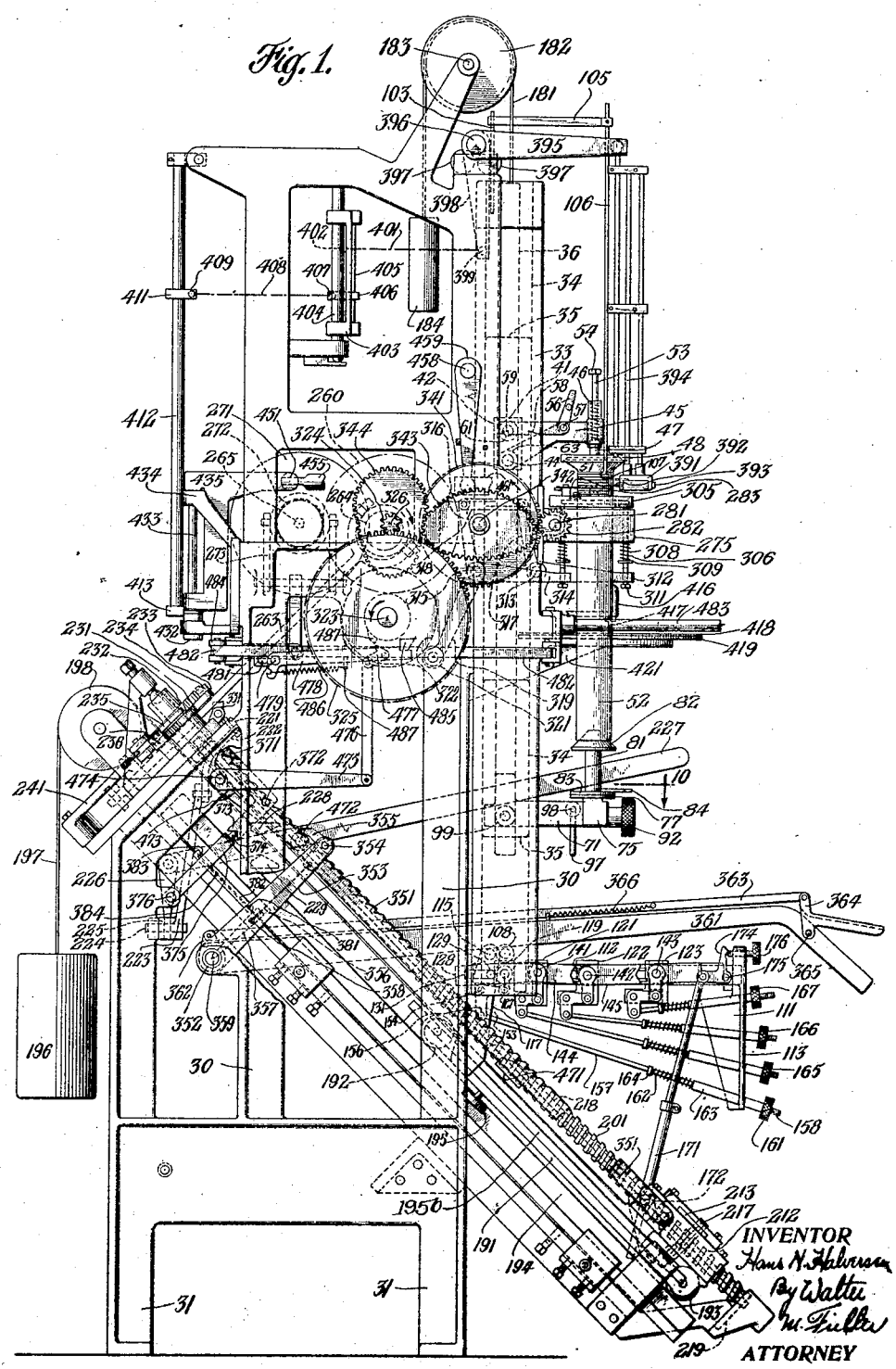

Figures 20, 21, 22, 23 and 24 illustrate the numbering mechanism; Figure 20 being an elevation, Figure 21 a plan view, Figure 22 a fragmentary detail on line 22 of Figure 20, Figure 23 a horizontal section of line 23—23 on Figure 20, and Figure 24 a vertical section of the line 24 of Figure 21.

Figures 25 and 26 are two views of opposite sides of the finished graduated product.

Referring to these drawings it will be perceived that the machine includes a main-frame 30 of irregular shape conveniently supported on suitable legs or feet 31.

By reference to Figures 1, 2, 8, 9 and 12 it will be seen that the front of the machine includes a plurality of upright, intermediate bars 32, 32 and corresponding end-bars 33, 33, spaced apart to provide six (6) vertical channels between them, the machine, in this particular instance, being adapted to graduate six vessels or receptacles at the same time.

Inasmuch as the vessel-supporting construction is the same for each of the several containers to be graduated, a complete description of one will suffice for all.

Each of these vertically-disposed bars 32 and 33 has registering grooves 34, receiving the marginal parts of a plate 35, each of the latter having on one face a longitudinal dove-tail rib 36.

An upper block 41, and its associated clamp-plate 42, is slidable along each rib 36, and may be clamped or fastened in any desired adjusted position by means of screws 43 as will be readily understood.

Each such member 41 is equipped with a stud 44 on which a bent arm 45 is rockingly mounted, the arm at its free forward end being apertured and receiving a vertical sleeve 46, the latter accommodating the cylindrical hub 47 of a slide clamp 48 having a beveled recess 49 adapted to accommodate the flaring base 51 of an inverted, glass graduate or other vessel 52 to be graduated in this machine.

The reduced-diameter shank 53 of such stem 47 or body 48 extends through an aperture in the end of shell or sleeve 46 and is externally equipped with a stop-nut 54.

A coil, expansion spring 55 encircles the shank 53, bearing at its lower end on the shoulder at the junction of parts 47 and 53 and pressing at its upper end against the inner face of the end of the shell 46, thus yieldingly pressing clamp 48 down against the top of base 51 of the glass vessel 52.

A spring-pressed bell-crank lever 56 is fulcrumed on arm 45 at 57, one arm of such lever forming a handle, the other arm having two notches 58 and 59 adapted to cooperate with a lug 61 outstanding from the block 41.

When the notch or recess 59 accommodates the lug, as shown in Figure 12, the arm 45 and its clamp 48 are held in the operative position indicated in such figure, but when the arm 45 and the vessel clamp are rocked upwardly about the axis 44 into an inoperative position releasing the vessel, they are held in such elevated relation by reason of the lug 61 being received in the notch or recess 58.

The outer end of each stud 44 is equipped with an anti-friction roller 62 (Fig. 12) adapted to snugly fit and travel in a vertical groove 63 (Fig. 9) on the next-adjacent, upright bar 32 or 34, as the case may be, and the cooperation of such roller with the walls of the groove materially reduces the strain on the other parts of the block.

To support the lower end of each of the inverted glass vessels 52, the following cooperative instrumentalities are provided.

A lower member 71 (Figs. 8, 9 and 12) is grooved at 72 to fit over the rib 36, and it is provided, as in the other instance, with a plate 73 equipped with a securing screw 74 to clamp member 71 fixedly in any adjusted position on the rib.

In registration with the vertical axis of vessel 52, this support 71, of irregular conformation, has a split bearing 75 for the reception of a stud 76 having a circular plate 77 having on its upper face two, semi-spherical recesses 78 and 79, about 180° apart, as shown in Figure 10.

Oscillatory on the fixed shaft or stud 76 above plate 77, a sleeve 81 is provided having an enlarged, conical head 82 at its upper end adapted to be partially inserted in the open lower end of the cylindrical glass vessel 52, (as shown in Figure 12), the bottom end of such sleeve having a circular plate 83 above and in register with plate 77 and equipped with an operating handle 84 and a semi-spherical projection 85 (Figure 10) adapted to be received in either one of the cavities 78 or 79 to locate vessel 52 in either one of two positions for the reception of the two vertical rows of display numerals.

Member 71 has bearings for a horizontal shaft 91 supplied at its forward end with a turning handle or knob 92 and having teeth cut near its rear end forming a pinion 93 the teeth of which are in mesh with those of a vertically-disposed rack 94, the body 71 being recessed for the accommodation of the rack as shown in Figure 9.

The purpose of this rack-and-pinion construction is to permit proper and accurate adjustment of the sliding plate 35 in its guide-ways 34 and the parts which such plate carries.

In order to lock the shaft 91 in adjusted position, it is provided with a clamp 95 (Fig. 9) between nut 96 on the shaft and the rack 94.

By means of a handle 97 (Figs. 8 and 12) adapted to turn a short camshaft 98 having a bearing in the member 71 and equipped with a cam acting on a sliding rod bearing on handle 92 whereby shaft 91 may be forced forwardly causing the clamp 95 to tightly engage the rack 94, thus locking the several parts in adjusted position.

As in the previous instance in connection with the upper block 41, this lower member 71 is supplied with an anti-friction roller 99 (Figures 8 and 9) in the groove 63 of the next upright bar.

Each pair of marginal guideways 34, 34 has a block 101 (Figs. 6 and 8) slidable therein below the two members 41 and 71 referred to, and such element 101 is similarly equipped with an anti-friction roller 102 designed to travel in groove 63 of the next upright bar.

Figure 2:
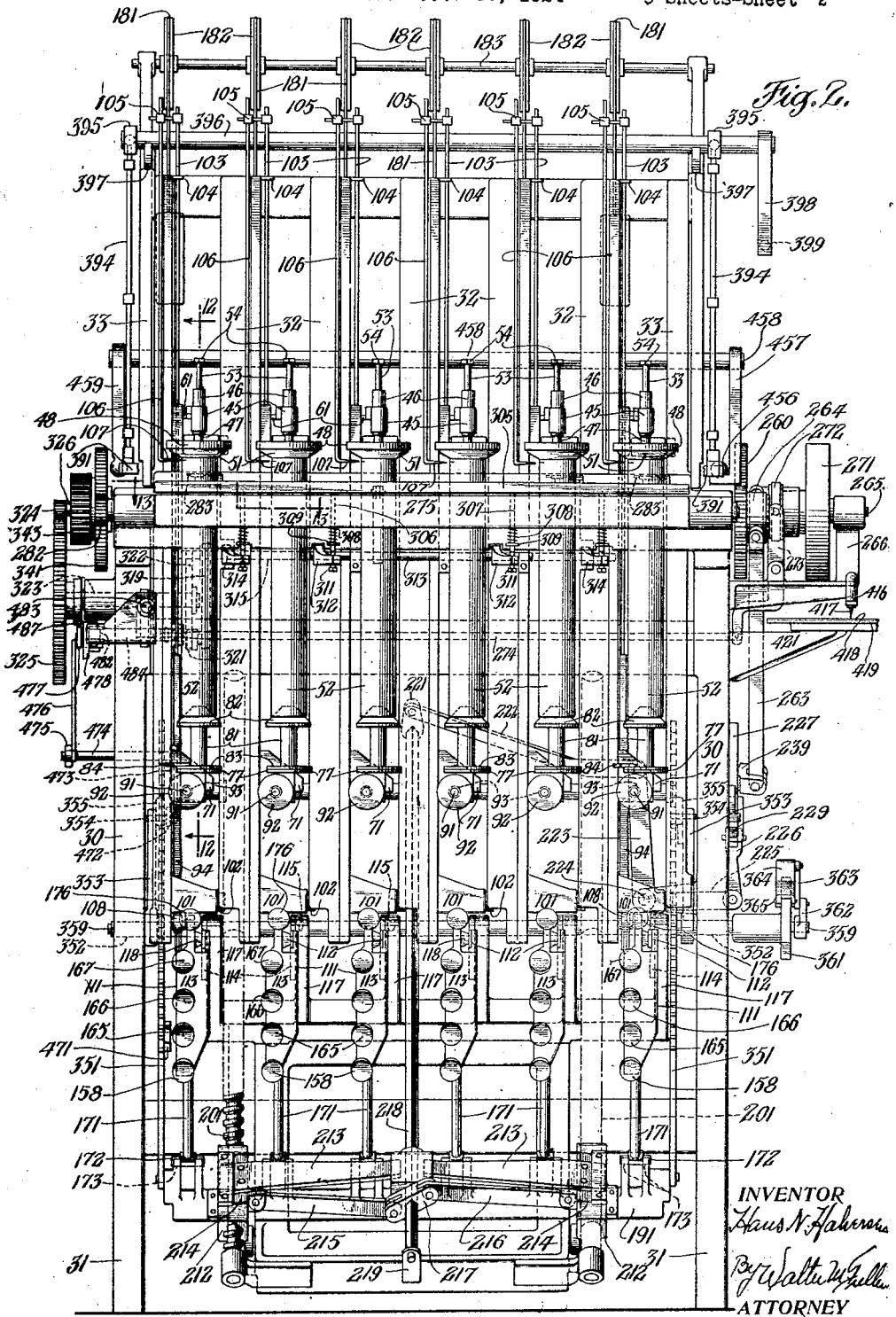
Figure 2 is a front view of the machine with certain parts of the mechanism in the background omitted and a portion of the numbering device broken away. The holding appliances of the two end vessels to be graduated are shown more or less completely in this figure, while the intermediate ones have been simplified for clearness of illustration.

Each rack 94 is fixedly secured to the member 101 in any approved manner and it terminates in a round rod 103 guided in a bearing 104 at the top of the machine (Figure 2).

By means of a connection 105, each rack-rod 103 carries a depending gauge-pointer 106 having an inturned lower end 107 for a purpose hereinafter indicated (Figure 2).

Each block 101 is also supplied with a roller 108 (Figure 8) designed to bear upon and cooperate with one of the movable flexible or articulated members beneath it now about to be described and employed for the purpose of compensating for the variations or irregularities in the internal size of the vessel to be graduated whereby proper spaces may be produced between the graduation lines and between the numerals associated with such lines.

Below each of the vertical channels each accommodating the three blocks 41, 71 and 101, I provide a right-angled member 111 (Figures 1, 6 and 7) comprising a generally-horizontal portion 112 and a front depending part 113.

The rear end of element 112 is fixed to an arm 114 having a stud 115 mounted and capable of oscillation in a bearing 116 on the top of an upstanding arm 117, forming part of an inclined, slidable carriage hereinafter described in detail.

Bar 112 on one face has a longitudinal, dove-tail rib 118 on which, in the present instance, four (4) blocks 119, 121, 122 and 123 are adjustably mounted and adapted to be held in adjusted position by their one or more set-screws 124.

Each of these blocks has a vertical, dove-tail groove 125, the four adjustably receiving four (4), correspondingly-shaped slides 126, 126ᵃ, 126ᵇ, and 126ᶜ.

The vertically-adjustable block 126 has a fulcrum pin 127 (Figures 6, 7, and 8) secured to it and rockingly mounted on such pin I provide a slotted end-link 128 forming one terminal element of the articulated or flexible member by means of which the upright vessel undergoing graduation is moved along step by step to provide the spaces between the graduation lines.

A pin 129, outstanding from the bar 112, with its axis in the same vertical plane as the axis of bearing 116, projects through the longitudinal slot 131 of link 128 and forms the means around which such link may turn and by which it is in part supported.

It is to be noted that the center of this pin is directly beneath the axis of roller 108 which is in exact register with the axis of bearing 116 so that any rocking adjustment of the end link under consideration does not influence the position of such roller or the glass vessel.

The rear end of the next duplex-link 132 is also pivoted on the fulcrum or pivot pin 127, such link comprising two side-plates straddling the intervening end of the link 128 on the pin 127, as is clearly indicated in Figure 8.

These two plates constituting a portion of the link 132 are grooved on their inner faces at 133, 133 to accommodate the longitudinal ribs 134, 134 on opposite sides of a middle slotted link-member 135 positioned between the plates 132 and having a sliding engagement therewith, so that the link 132, as a whole, may be lengthened or shortened as required.

This flexible or articulated member, comprising the several jointed members, has the pivot pins 127, 141, 142 and 143 mounted on the slides 126, 126ᵃ, 126ᵇ and 126ᶜ, respectively, and pivotally connecting together the extensible and contractible links already described and also those characterized as a whole 144 and 145, which are substantially of the same construction as the others but of different lengths, as is clearly shown in Figure 6.

The several links unitedly constituting the flexible member are of progressively greater length, as depicted in Figure 6, because the vessels to be graduated vary in internal caliber more near their bases than elsewhere, hence requiring shorter links to accurately compensate or counterbalance for such variations in the spaces between graduation lines.

Outside of or beyond the link members described as mounted on the pin 127, I provide a pair of links 151, 151 (Figure 6) the lower ends of which at 152 are pivotally connected to one arm of the bell-crank lever 153 fulcrumed at 154 to an extension 155 of the block 119, the other arm of such bell-crank lever being pivotally connected at 156 to a rod 157 having a threaded end portion 158 extended through a hole 159 in the part 113, such rod being equipped with a threaded nut handle or knob 161 by means of which the rod may be adjusted, a coil-spring 162 encircling the rod between a sleeve 163 and a collar 164 slidably adjustable lengthwise on the rod and held in place by a set screw, not shown.

It will be understood from this construction that, by manipulation or turning of handle 161, the fulcrum-pin 127 may be raised or lowered.

The three other pivot-pins 141, 142 and 143 are similarly vertically adjustable by like constructions equipped with nut-handles 165, 166 and 167.

The over-lapping ends of the several link elements are rounded concentrically with the axes of the pivot pins as shown in Figures 6 and 7, so that there may be no abrupt projections along the top surface of such articulated construction.

The front end of each member 112, 113 is supported on the inclined, sliding carriage referred to by means of a telescopic, lengthwise extensible and contractible rod 171 (Figures 1, 2 and 6) having trunnions 172 near its lower end accommodated in seats or saddles 173 on the sloping carriage mentioned.

The upper end of this supporting or brace rod 171 is pivotally connected to one arm of the bell-crank lever 174 fulcrumed at 175 on the member 112, the upstanding arm of the bell-crank being in contact with an adjustment screw 176 having threaded engagement with a hole through the top portion of the element 113.

It will be clear through an understanding of this construction that the position of the member 112, 113 may be varied either by reason of an extension or shortening of the rod 171 or by turning of the adjustment screw 176.

In order to relieve, in part, the weight of the several, vertically-slidable plates 35 and the elements which they carry, there is attached to each a cord or cable 181 (Figures 1 and 2) extended over a pulley or sheave 182 on a shaft 183 at the top of the machine, a rear, depending end of the cord or cable being fitted with a weight 184, not wholly counterbalancing the weights of the parts on the other end of the cable but relieving the load imposed on the carriage and its series of articulated members.

Referring now to the inclined, screw-actuated, intermittently-operated carriage 191 previously mentioned, it will be observed that, at each end, such carriage has two rollers 192 and 193 (Figure 6) designed to travel on the top face of inclined bars 194 forming parts of the main-frame, the lateral shifting of such carriage being prevented by rollers 195 bearing on the outer faces of such sloping supports 194, and rollers 195ª cooperating with guide-bars 195ᵇ (Figs. 1 and 6).

The weight of this oblique carriage is more or less counterbalanced by one or more weights 196, each on a cord 197 connected to the carriage and passing over a suitably-supported pulley or sheave 198 mounted on the back part of the main-frame.

Such inclined carriage, on which are mounted the plurality of flexible or bendable members co-acting with the supports for the vessels to be graduated, is fed upwardly by a pair of appropriately-supported, sloping screws 201, 201 (Figures 1, 2 and 6) the lower end of each of which has a ball step-bearing 202 (Figure 6), the upper end having a suitable bearing as shown in Figure 1.

In a construction of this character, it is desirable not only to feed the carriage upwardly by the intermittent rotation of these screws, but also to permit the sliding of the carriage on its supports independently on the screws and accordingly the machine is equipped with the following, co-operating, mechanical elements.

As is shown in Figures 2, 6 and 11, the carriage for each screw is supplied with an outer, semi-cylindrical bearing 211 in a block 212 fixedly mounted on the carriage, and opposite this and guided in its reciprocations by the carriage itself and by a supplemental bar 213, I provide an inner half-nut bearing 214, which may be reciprocated into and out of cooperative relation with the corresponding feed-screw 201.

When the two half-nuts are up against the screws, as shown in Figure 11, the carriage will be advanced when the screws are turned, but, when the half-nuts are retracted from the screws, then the carriage may be slid freely lengthwise of the then-stationary feed-screws.

Of course, these two half-nuts must be actuated simultaneously, and, accordingly the two are joined together by means of links 215 and 216 connected to the opposite ends of an arm 217 (Figure 2) centrally mounted on an inclined shaft 218, square or angular in cross-section, and oscillatory in suitable bearings, one of which 219, is indicated in Figure 2.

The upper end of such shaft 218 has an arm 221 fixed thereto and connected by one or more bent links 222 and an upright arm 223 to a bell-crank lever fulcrumed at 224, a horizontal arm 225 of such bell-crank lever being joined by a link 226 to the rear end of a lever-handle 227 fulcrumed on the frame of the machine between two blocks 228 and 229 (Figure 1).

By manipulation of this handle, the two half-nuts can be easily shifted into and out of co-active relation with the pair of inclined feed-screws.

We will now turn to a consideration of the construction of the means for interruptedly or intermittently rotating such carriage-feeding screws, particular reference being had to Figure 3.

At its upper end each such inclined screw-shaft has fastened to it a ratchet-wheel 231, and free to rotate on the screw-shaft adjacent to the ratchet-wheel is a segmental-gear 232 having a radial arm 233 equipped with a spring-actuated pawl 234 adapted to cooperate with the notches of the ratchet-wheel, the latter being also supplied with a spring-actuated retaining pawl 235 adapted to prevent overthrow.

The teeth of these two fragmentary gears are in mesh with those of a slidingly-mounted rack 236 constructed to reciprocate in suitable bearings on the rear, inclined portion of the machine frame.

Such rack is slid back and forth by means of a bent link 237 pivotally connected at 238 to one arm of a bell-crank lever 239, which may be fulcrumed in a casing 241 at any one of three points 242, 243 and 244, depending upon which registering holes are supplied with the fulcrum-pin 245, the latter being capable of insertion in any one of three holes to vary or modify the extent of the stroke of the link 237, which determines the degree of the turning action of the ratchet-wheels by the pawls.

The other end of link 237 is fulcrumed at 246 to a block 247, slidable beneath an apertured plate 248 mounted on and spaced from the rack 236 by means of two, end, supporting and spacing blocks 249 and 251, block 247 being normally retained between member 251 and the adjacent end of an arm 252 fulcrumed at 253 and ordinarily pulled upwardly by a spring 254 fastened to a pin 255 projecting from plate 248 and its other end to a lug 256 on the arm 252 and extended upwardly through aperture 257 in plate 248, such lug carrying an anti-friction roller 258 designed to coact with a cam bar 259 on an approximately-mounted rock-shaft 261, the rack being recessed at 262 for the reception of the arm 252 when it is depressed by the cam.

Thus, normally, the link 237 is in direct pivotal connection with the rack which it reciprocates, but because of the marking of each tenth graduation line completely around the vessel being graduated, it is necessary to permit an idle stroke of the block 247 at that time, and, under such circumstances, the arm 252 is held depressed by the oscillatory cam 259, so that the block 247 reciprocates over it rather than operatively bearing against its end.

The bell-crank lever 239 is rocked by a link 263 having a bifurcated or forked upper end straddling and actuated by an eccentric 264 on a suitably journaled shaft 326 (Figures 1 and 2) revolved through gearing 260 by the main drive-shaft 265 supported at its outer end in a bearing on a bracket 266.

Such drive-shaft is rotated by means of a pulley 271 thereon and an appropriate clutch 272 and its yoke-lever 273 which is connected to the other side of the machine by a link 274, (Figure 2) referred to hereinafter, and which is automatically operated to stop the machine by throwing out the clutch, when the final graduation lines have been made.

By the means described, the pair of inclined, parallel screws are turned intermittently or step by step causing a corresponding, upward rearwardly-sloping travel of the carriage on which is mounted the plurality of flexible members governing the upright travel of several vessels or glass receptacles undergoing graduation.

Considering now the scriber or marking mechanism for making or scratching the graduation lines in the wax on the several vessels, it will be sufficient to describe one of these in detail, because they are all alike, and one description will be adequate for all.

Across the front of the machine and fastened to its frame is a bar 275 (Figures 1 and 2) having a plurality of vertical cylindrical apertures 276, corresponding in number to and adapted to receive the vessels to be graduated.

Each such aperture constitutes a bearing for a sleeve 277 (Figures 13 and 14) having external gear-teeth 278 around its periphery, these several gears and their sleeves being rotated in synchronism by spiral-gears 279 on a shaft 281 having a gear 282 on its end revolved by means hereinafter described.

On the top edge of each one of these sleeves 277 a sharp-pointed scriber or marker 283 is rockingly mounted at 284 and it is equipped with a tail 285, a coil-spring 286 tending to rock the scriber toward the vessel to be marked or graduated extended through the sleeve 277.

Inasmuch as these scribers, which rotate around the glass-vessels are to make some graduation lines thereon extending only part way around the vessels, it is necessary to provide means, at the proper time, to shift the scribers away from such vessels, and, accordingly, the top edge of each sleeve 277 is provided with a rock-arm 291, fulcrumed at 292, and carrying a supplemental arm 293 rockingly mounted thereon at 294, such auxiliary arm overlapping the scriber tail 285 being adjustable on the main rock-arm 291 by set-screws 295 and 296.

The lower end of the fulcrum-pin 294 carries a narrow, anti-friction roller 297 designed to cooperate with a plurality of vertically-adjustable cams to modify the action of the scriber or marker on the glass vessel, that is to say, to cause it to approach or recede from the glass-vessel.

The scriber-controlling cams referred to, in the present instance, are four in number, 301, 302, 303 and 304 for each scriber and vessel, such cams being concentrically mounted in an aperture in a plate 305 (Figures 1, 2, 12, 13, 16, 17, 18 and 19) located above the bar 275, this plate, of course, having as many sets of cams as there are scribers on the machine.

Plate 305 has fixed to it four, depending, vertical rods 306 and 307 (Figure 2) extended down through holes in the bar 275 and equipped below the latter with encircling springs 308 bearing against the under face of such bar and against collars 309 on the rods (Figure 1), the position of these plate-supporting rods being determined by adjustment-screws 311, 311 extending up through threaded holes in horizontal, forwardly-projecting arms 312, 312 mounted fixedly on a suitable-journaled rock-shaft 313 and in like manner, the rear part of the plate 305 is supported on arms 314, 314 on a rear, appropriately-journaled rock-shaft 315.

Arms 316 and 317 (Figure 1) of equal length, fastened to the two shafts 315, 313, respectively, are connected together by a link 318, so that whatever rocking movement is given to the one shaft will be equally transmitted to the companion shaft.

Shaft 315 has another arm 319 (Figure 1) fixed thereto and supplied at its end with a roller 321 co-acting with the edge of a cam 322 on a shaft 323, driven from the shaft 326 by intermeshing gears 324 and 325 in a ratio of 1 to 11.

Therefore, cam 322 through the mechanical elements specified causes the raising and lowering of the cam-carrying plate 305.

Assuming that the glass vessel is now placed in position ready for marking, the roller 297, governing the approach of the scriber to and its recession from the vessel, travels around on the surface of the relatively-stationary cam 301 until it reaches the depression in the cam, at which time the scriber approaches the vessel and begins to mark the graduation line.

Then the plate 305 raises the cam 303 into the path of the roller 297, this being the cam which is used for marking the unit lines (see Figure 17).

The scriber and roller continue to revolve around the vessel marking the required number of unit lines, after which plate 305 is elevated still higher bringing cam 304 into the path of the roller (Figure 18) for marking the fifth line which is somewhat longer than the unit lines.

Then the plate 305 descends again to the unit line position making, in this case, four additional unit lines, whereupon the plate is shifted bringing cam ring spacer 302 opposite the roller (Figure 19) for the marking of a complete graduation ring around the vessel for each tenth line.

In marking such tenth ring or line around the article undergoing graduation, the scriber or marker 283 is brought against the vessel by the unit-line cam, then immediately after starting the mark, the plate 305 brings the second cam 302 into action, and then the first cam, just as the depression of the first cam is in register with the roller, this tenth-line marking operation taking just a little more than one complete revolution of the roller.

The scriber is then retracted clear of the vessel and the balance of the revolution is idle and the screw again advances the carriage for the next unit line.

During the extra revolution of the scriber or roller, that is during the marking of the ring completely around the vessel, the carriage is not advanced by reason of the depression of arm 252, explained before, but during the next subsequently-idle revolution of the scriber, the vessel is advanced one step to the next unit line position.

Thus, it will be perceived, that the scriber or marker makes eleven revolutions around the vessel for the making of each ten lines.

As has been indicated above, the omission of one advance step of the carriage for each ten lines is brought about by the descent of cam-arm 259 into the path of travel of the roller 258, the mechanism for accomplishing this action comprising the following parts, particular reference being had to Figure 4.

Shaft 261 has an arm 331 thereon connected by a link 332 to one arm of a bell-crank lever 333 fulcrumed on the frame at 334 and having a roller 335 co-acting with a suitably-shaped cam 336 on shaft 323 beside cam 322.

It is desirable that the scribers or markers should approach the vessels to be graduated and should recede therefrom comparatively slowly so that the beginnings and endings of the graduation lines may be in exact register, but to economize on time, the rotation of the scribers during marking operations and their idle partial rotations is at a much higher speed by the improved mechanism of this machine which accomplishes this result advantageously and effectively by cooperative mechanical elements about to be described.

It will be remembered that the scriber-rotating shaft 281 has a gear 282 (Figures 1 and 13) which is in mesh with a larger gear 341 on a jack-shaft 342 furnished with an elliptical drive-gear 343 meshing with a similarly-shaped gear 344 on shaft 326, and by this means the specified, desirable irregular rotation of the several scribers is brought about.

The inclined, sliding carriage should be capable of movement otherwise than by its two feed-screws to shift the flexible elements, which compensate for the irregularities in the internal calibers of the vessels to be graduated, to quickly move the vessels to different points corresponding to preliminary gauge marks on the vessels, whereby the flexible elements may be properly individually adjusted to accurately perform their functions, and to this end the following parts have been provided in this machine:

At its two sides the sliding carriage has two, inclined ratchet-bars 351, 351 (Figures 1 and 2), secured thereto, and, across the back of the machine, I supply a properly-journaled, hollow rock-shaft 352 (Figure 1) having fastened thereto two arms 353, each adjacent to one of the ratchet-bars, and on the end of each such arm I pivot at 354, a bell-crank pawl 355, one arm of which acts as a latch to co-act with the ratchet-bar, the other arm having a leaf-spring 356 connected thereto at one end, the other end being mounted on a lever 357 fulcrumed on the side of the arm 353 at a point 358, this arm having a bearing at one end on a shaft 359 inside of the hollow shaft 352.

A bent handle lever 361 is secured to one end of the hollow shaft 352, and an arm 362, secured to a protruding end of the inner shaft 359, is connected by a link 363 to an auxiliary handle-lever 364 fulcrumed on the main-handle at 365, a coil contractile spring 366 connecting parts 361 and 363, as shown in Figure 1.

A belt-crank holding-pawl 371 (Figure 1), one of which is provided for each ratchet-bar, fulcrumed on the main-frame at 372, has a V-shaped end 373 receiving a spring-pressed plunger 374 on an arm 375 rockingly mounted on the main-frame at 376.

Each arm 353 at a point 381 has a bar 382 pivoted thereon, such bar being slidingly associated with the corresponding rock-arm 375 and having two, spaced pins 383 and 384 on opposite sides of and overlapping the edges of the member 375.

When it is desired to slide the carriage upwardly by the mechanism illustrated and described, it is merely necessary to raise handle 361 the desired amount and the locking pawls 371 will ride over the teeth of the ratchet-bars and automatically fall into the desired notches, retaining the ratchet-bars and carriage in the new position, and this operation may be repeated as many times as is desired.

When, however, the carriage is to be shifted downwardly step by step by this hand mechanism, the operator, by actuation of the supplemental-handle 364, releases the pawls 355 from their respective notches, and, thereupon, by raising handle 361, permits the pawls to engage new and more elevated notches, but before the carriage can be permitted to descend the pawls 371 must be released from their notches.

To do this, the operator continues the upward raising of the lever 361, and when pins 384 press against the sides of arms 375, the two pawls 371 are retracted out of their notches, permitting the operator to let the carriage descend, the handle 361 and pawls 355 by this time being in the notches referred to.

As soon as the descent is accomplished, the pins 383, by engagement with the other edge of the arms 375, will automatically cause the holding pawls 371 to enter the new notches and locate the carriage in the new position.

This lowering operation may be reproduced as many times as is necessary.

Turning now to that portion of the mechanism that marks the numerals or graduation figures on the glass vessels opposite certain pre-determined graduation lines, as shown for example in Figures 25 and 26, it will be perceived that the machine includes a relatively-long plate 391 (Figures 1, 20 and 21) equipped with six pointed or needle-like markers 392 which are yieldingly pressed inwardly toward the glass vessels by leaf spring 393 mounted on the plate.

At its two ends, this plate is supported on upright, lengthwise-adjustable sustaining-rods 394 (Figures 1 and 20) which, at their upper ends, are mounted on a pair of forwardly-projecting arms 395, 395 on a shaft 396 rotatably supported by anti-friction roller-bearings 397, 397.

Shaft 396 is equipped at one end with a depending arm 398 connected at its lower end by a ball-and-socket joint 399 to a link 401, the other end of which is associated by a similar joint 402 with an upright bracket 403 rockingly mounted on the main-frame at 404.

This bracket carries an upright rod 405 on which is adjustably mounted a block 406 having a ball-and-socket joint connection 407 with a link 408, the opposite end of which has a like connection 409 with a block 411 similarly vertically adjustable on an upright rock-shaft 412 oscillatory in suitable bearings.

The lower end of the shaft 412 has a block 413 (Figures 21 and 22) provided with a universal-joint connection 414 with a forwardly-extending arm 415 adjustable as to length and carrying at its front end on its top a manipulating knurled knob 416 (Figure 20) and on its under surface a pointer or needle 417 designed to co-act with the several, engraved, numeral recesses 418 (Figure 21) on the round, centrally-apertured, master, marking plate 419 adapted to be turned around the axis of a round portion 420 of a supporting bracket 421 to bring any one of the master numerals into operative position, in which relation it is held locked by a catch 422 on a cross-bar 423 designed to enter any one of the plurality of locking recesses 424 on the plate 419 and corresponding in position to the several engraved numerals, and it will be understood that, as the tracing-pointer 417 is caused by hand to travel around the numeral grooves or channels of the plate 419, bar 415 will be moved backwardly and forwardly and also sidewise during such operation.

The remainder of the mechanism for causing the markers 392 to travel in paths corresponding to that of the pointer or stylus 417 for the marking and numbering simultaneously of the several vessels will now be described.

The universal-joint construction 414 is also connected to a back rod 431 which at its other end is bifurcated at 432 (Figures 20 and 23) and is rockingly mounted on an upright, stationary shaft 433 supported in a fixed bracket 434, the axis of the shaft 433 constituting the center around which this comparatively-long rod 431 turns.

Rockingly mounted on the stationary shaft 433, I provide a bracket 435 having adjustably fixed to its lower end a forwardly-projecting arm 436, the length of which may be varied and the arm held in an adjusted position in any approved manner, as by tightening screws 437, the free end of arm 436, by a ball-and-socket joint 438, being connected to a rod 439, which, at its opposite end, by means of a similar ball-and-socket joint 441 (Figure 22) is associated with a collar 442 adjustable lengthwise on the part 415, the rod 439 having a telescopic adjustable connection so that its length may be varied.

The oscillatory bracket 435, at its upper end, has a forwardly-extending arm 451 (Figure 21) which, by means of a ball-and-socket joint 452, is connected to a rod 453, capable of variation as to length, and pivotally connected at 454 to a lever 455 fulcrumed, by means of a ball-and-socket connection 456 on an inwardly-extended lug on the lower end of an arm 457 fixed to one end of a suitably-journaled shaft 458 (Figures 2 and 20) the front end of the lever 455 being joined by a ball-and-socket connection with the corresponding end of the plate 391.

At its opposite end shaft 458 is supplied with another arm 459 (Figure 20) of the same length and same angular position as arm 457 and connected to the corresponding end of the plate 391 by a bar 461 having ball-and-socket joint connections with each of the parts 459 and 391.

In order to be able to move the plate 391 and its several marking needles out of the way and out of contact with the glass vessels when desired, a handle 462 (Figures 20 and 21) is mounted on and secured to arm 457, and it will be apparent that by moving this handle, through the mechanism described, the plate 391 can be shifted for the purpose indicated, a catch 459$^b$ on arm 459 being adapted by engaging a recess 459$^c$ in the frame to hold the parts in the position to which they have been moved by the handle thus maintaining the scribers or markers clear of the vessels when setting the machine for marking, thus avoiding unintentional scratching of the coated surfaces of the vessels, a set-screw 459$^a$ being also provided which by cooperation with arm 459 prevents the bar 391 from accidentally striking and breaking the vessels.

It will be readily understood, that, as the tracing-pointer 417 is moved backwardly and forwardly horizontally, it rocks the upright rod 412 in a corresponding direction and this movement through the parts 408, 403, 401, 398, 396 and 395 is translated into a vertical movement of the scribers 392, such movement being proportional to, but not necessarily equal to, the corresponding movement of the tracing-needle 417.

By adjusting the position of the link 408 up or down on the rods 405 and 412, a greater or lesser leverage is secured, and a variation in the heights of the scribed numerals can be easily effected, it being apparent that the sizes of the numerals should ordinarily be proportional to the sizes of the vessels undergoing graduation.

The cross-wise movements of the tracing needle of pointer 417 causes horizontal, lateral oscillations of the arm 415, and these are transmitted through the link 439 to the oscillatory bracket 435, and from the latter through the parts 451, 453 and 455 to the plate 391 and its several scribers.

The variation in the widths of the numerals may be effected by merely adjusting the length of the arm 436, so that numerals of any reasonable width may be marked on the glass vessels by the use of the single master-plate 419.

The position of shaft 433 may be different from that shown, if preferred, to modify the shape or general character of the numerals marked on the vessels.

It is desirable to stop the operation of the machine after the final graduation lines have been marked, and to accomplish this result the following parts are provided.

A cam 471 (Figure 1), adjustably mounted on one side of one of the ratchet-bars 351, is designed during its upward, inclined travel to contact with an anti-friction roller 472 (Figure 1) on an arm 473 fixed to a rock-shaft 474 equipped with a longer arm 475 connected by a link 476 to a hook 477 pivoted on a long latch 478 having a fulcrum-pin 479 slidable in a slot 481 of a link 482 pivotally joined at its front end to a rockingly-mounted, forwardly-extended handle 483, and in like manner connected at its rear end to one arm of a bell-crank lever 484, the other arm of which is connected by the rod 274 (Figure 2) to the clutch-lever 273 (Figures 1 and 2).

Manipulation of handle 483 will throw the clutch into and out of operation by the means described, but in order that it may be shifted to stop the machine automatically when the final graduation lines have been made, a fixed lug or abutment 485 is provided on the frame of the machine with which a notched end of the catch or latch 478 is adapted to cooperate, as shown in Figure 1, the short arm of such catch being connected by a coil, contractile spring 486 to a pin 487 on the main-frame.

When the handle 483 is turned or rocked to put the clutch in operative position, the right-hand end wall of slot 481, by engagement with the pivot-pin 479, forces the catch to the left against the action of spring 486, as shown in Figure 1, until the hook end of the latch springs up and bears against the lug or abutment 485, in this way storing power in the strained spring 486, but, owing to the slot connection with the fulcrum-pin of the latch, the clutch can at any time be thrown into and out of operation by the handle.

In order to release the clutch automatically after the marking of the final graduation lines, the shaft 323 is equipped with a cam projection 487 (Figure 1) normally revolving out of contact with hook 477, but when cam 471 on the carriage, by contact with the roller 472, rocks the arms 473 and 475 upwardly, it carries hook 477 into the path of travel of the projection 487 so that at the proper moment the latter engages the hook and rocks the latch 478 downwardly away from the abutment 485, whereupon contraction of the spring 486 pulls the link 482 to the right, as viewed in Figure 1, throwing the clutch out of action and stopping the machine.

The machine is operated substantially as follows:

Assuming that the six glass vessels to be simultaneously graduated have been externally coated with a suitable, etching-resistant material, such as wax or paraffin, and by means of accurate measured amounts of liquid have been provided by hand with short test-marks made with paint or ink on the glass vessel before being coated with the wax corresponding to certain, pre-determined, graduation lines—for example the second, twentieth, fiftieth and hundredth lines from the bottom of the vessel, corresponding, for instance with graduation marks 20—200—500 and 1000, and, assuming further that the several vessel-supporting blocks 41 and 71 in the plurality of upright channels or spaces have been adjusted on their respective slides at proper positions for the reception of vessels of the sizes to be graduated, these several glass-cylinder graduates or other vessels are inserted in inverted relation with the parts 82 in their open mouths and the top clamps are turned down to lock them into place.

Then, after unlocking the several knobs or handles 92, by turning the locking handles 97, these several members 92 are turned individually to bring the first test line on each cylinder—that is, the test line nearest its enlarged base—exactly into register with the corresponding index or pointer 107.

This insures that the test line will be exactly in register with the pointer 107 when the roller 108 is on the complementary portion of the flexible or articulated member which is to cause the lengthwise travel of the vessel during graduation.

The several glass cylinders to be graduated were inserted in the machine just after the latter had completed the graduation of the preceding set of vessels and the appliance is in its hundredth or final graduation line position, and the turning of handles 92, to effect the register above specified, was done when the above-mentioned glass cylinders were in final line position.

It is now necessary to adjust the plurality of articulated members corresponding to the final or hundredth line position for each of the glass vessels and for this purpose the top surface of the plate 391 is used as a sight-gauge when the tracing pointer 417 is located in a fixed-depression 491 in stationary bracket 421 which gives a definite location as to the height of the plate 391.

Each screw 176 is turned to raise or lower its entire flexible mechanism until the hundredth or final test or gauge mark on each vessel is exactly in register with the top surface of the plate 391.

At this time each roller 108 will be substantially above the axis of the corresponding pivot-pin 142, or, if preferred, such adjustment might have been made by manipulation of the handle 166, or of the two handles 166 and 176, conjointly.

Thereupon, the operator, after releasing the two half-nuts by handle 227, by means of the lever 361 and its associated auxiliary handle 364, lowers the carriage down to the fiftieth line position at which time the axes of rollers 108 will be practically above the axes of the pivot-pins 141, and then the workman turns the knobs or handles 165 individually and in succession to bring each test or gauge mark of the fiftieth line position on the vessel into exact register with the top surface of plate 391.

Next, the operator, by means of handle 361 and its supplementary handle 364, feeds the carriage down to the twentieth line position at which time the axes of the rollers 108 will be approximately above the axes of the corresponding pivot-pins 127 and he turns the several handles 161 to adjust the positions of the vessels so that their twentieth-line test marks will exactly register with the top surface of plate 391.

It may be remarked in passing, that the other pivot-pins 143 and their links are used when more than one hundred graduation lines are marked on the vessels, or provided a greater number of test marks are originally placed on the vessels.

The carriage is now shifted to the tenth line position and the operator, by means of knob 416 and that member on plate 419 bearing the numeral "100", traces such engraved numeral with the stylus 417, thereby marking a "100" of appropriate size at the tenth line position on all six of the vessels simultaneously (see Figure 25).

Then he shifts the carriage to the twentieth line position and places the numeral "200" on all of the vessels at the same time, and he continues this operation until he has applied the entire ten numbers—"100" to "1000" inclusive.

This is all done while plates 83 are held in one of their two positions with the detents 85 in one of the recesses 78 or 79, assuring a straight line of display numerals scratched through the wax coating on each vessel by its sharp marker 392.

After this has been completed, all six of the plates 83 are shifted by means of their handles 84 until the detents 85 are in the other recesses 78 or 79, thus turning all of the glass vessels on their own axes approximately 180°.

Now the operator, by the means previously described, simultaneously places the numerals zero "0" in the new rows of figures for the graduation lines (not yet made) farthest from the bases and then feeds the vessels step by step and in sequence applies the numerals "100" to "900" inclusive, all of which will readily be understood (see Figure 26).

Owing to the fact that the several flexible members had been previously adjusted, these markings are spaced apart amounts which compensate for the irregularities in the internal calibers of the vessels even though their markings on the vessels occur simultaneously.

The operator is at this time ready to apply the graduation lines on the vessels spaced apart varying amounts compensating for a like variation in the internal calibers by means of the articulated members.

It will be observed that the links of these articulated members corresponding to the lower portions of the glass vessels are shorter than the other links and, as referred to above, this is due to the fact that there is likely to be a greater variation in caliber in such portions of the vessels hence requiring more accurate compensation in the graduations.

The carriage by means of handle 361 is lowered to the unit line position and handle 227 is then raised to shift the two half-nuts 214 into operative relation with the two feed-screws 201, whereupon, by means of handle 483, the clutch 272 is rendered operative, and, at the same time, latch 478 is carried rearwardly, straining spring 486, and caused to overlap and bear against abutment 485, which maintains the latch in this retracted position.

Then, the machine automatically marks spaced graduation lines of different lengths on all of the vessels at the same time, the unit lines being of one length, the fifth lines somewhat longer, and the tenth lines extending entirely around the vessels.

To make up for the longer marking of such tenth lines, during which period the vessels must not move lengthwise, the cam 259 is automatically shifted into position so that during the production of such tenth lines there is no movement of the rack 236 to operate the carriage feed-screws.

At the proper moment, however, cam 259 rocks out of the way of the roller 258, and, upon reestablishing the operative connection between link 237 and the rack, the marking of lines of less length than entirely around the vessels is continued.

When the final or hundredth lines have been completed the lug 487 engages the hook 477 and releases the latch 478 in a manner hereinbefore described, thus causing the throwing of the clutch out of action and stopping the machine, whereupon the graduated, numbered vessels may be removed and replaced by others to be graduated.

Those skilled in this art will readily understand that many changes may be made in the machine illustrated and described without departure from the heart and substance of the invention, as defined by the appended claims, and without the sacrifice of any of its substantial benefits and advantages.

I claim:—

1. In a graduating appliance, a combination of means to support the vessel to be graduated, means to mark graduation lines on said vessel, and means to move said vessel and marking means relatively to one another to produce the spaces between the lines including an articulated member capable of adjustable flexure to produce variations in said spaces conforming substantially to the irregularities of the internal caliber of the vessel.

2. In a graduating appliance, the combination of means to support the vessel to be graduated, means to mark graduation lines on said vessel, means to move said vessel and marking means relatively to one another to produce the spaces between the lines including an articulated member composed of links pivotally connected together, and means to adjust said pivot connections to flex said member to produce variations in said spaces conforming substantially to the irregularities of the internal caliber of the vessel.

3. In a graduating appliance, the combination of means to support the vessel to be graduated, means to mark graduation lines on said vessel, and means to move said vessel and marking means relatively to one another to produce the spaces between the lines including an articulated member composed of extensible and contractible links pivotally connected together and capable of adjustable flexure to produce variations in said spaces conforming substantially to the irregularities of the internal caliber of the vessel.

4. In a graduating appliance, the combination of means to support the vessel to be graduated, means to mark graduation lines on said vessel, means to move said vessel and marking means relatively to one another to produce the spaces between the lines including an articulated member composed of extensible and contractible links pivotally connected together, and means to adjust said pivot connections to flex said member to produce variations in said spaces conforming substantially to the irregularities of the internal caliber of the vessel.

5. In a graduating appliance, the combination of means to support the vessel to be graduated, means to mark graduation lines on said vessel, and means to move said vessel and marking means relatively to one another to produce the spaces between the lines, including an articulated member composed of links of different lengths pivotally connected together and capable of adjustable flexure to produce variations in said spaces conforming substantially to the irregularities of the internal caliber of the vessel.

6. In a graduating appliance, the combination of means to support the vessel to be graduated, means to mark graduation lines on said vessel, means to move said vessel and marking means relatively to an another to produce the spaces between the lines including an articulated member composed of links of different lengths pivotally connected together, and means to adjust said pivot connections to flex said member to produce variations in said spaces conforming substantially to the irregularities of the internal caliber of the vessel.

7. In a graduating appliance, the combination of means to support the vessel to be graduated, means to mark graduation lines on said vessel, and means to move said vessel and marking means relatively to one another to produce the spaces between the lines including an articulated member composed of links of progressively-increasing length and capable of adjustable flexure to produce variations in said spaces conforming substantially to the irregularities of the internal caliber of the vessel.

8. In a graduating appliance, the combination of means to support the vessel to be graduated, means to mark graduation lines on said vessel, means to move said vessel and marking means relatively to one another to produce the spaces between the lines including an articulated member composed of links of progressively-increasing length pivotally connected together, and means to adjust said pivot connections to flex the member to produce variations in said spaces conforming substantially to the irregularities of the internal caliber of the vessel.

9. In a graduating appliance, the combination of means to support the vessel to be graduated in a substantially upright position, means to mark graduation lines on said vessel, and means to move said vessel and marking means relatively to one another to produce the spaces between the lines including a carriage arranged to travel in a path inclined with relation to the substantially upright vessel, a plurality of screws to feed the carriage, and means to intermittently turn said screws simultaneously and equally.

10. In a graduating appliance, the combination of means to support a plurality of vessels to be graduated in substantially upright position, means to simultaneously mark graduation lines on said vessels, and means to move said vessels and their marking means relatively to one another simultaneously to produce the spaces between the lines including a carriage, and plurality of screws to feed the carriage, and means to intermittently turn said screws simultaneously and equally.

11. In a graduating appliance, the combination of means to support the vessel to be graduated, a scriber to mark the graduation lines on the vessel, means to feed the vessel and scriber relatively to one another to provide the spaces between the lines, means to revolve the vessel and scriber relatively to one another at a variable speed, and means to cause the vessel and scriber to approach and recede from one another to control the marking period of the scriber.

12. In a graduating appliance, the combination of means to support the vessel to be graduated, a scriber to mark the graduation lines on the vessel, means to feed the vessel and scriber relatively to one another to provide the spaces between the lines, means to rotate the vessel and scriber relatively to one another at a variable speed, and means to move the scriber and vessel relatively toward and from one another to control the marking period of the scriber, said means causing such approach when the relative rotation of the scriber and vessel is comparatively slow.

13. In a graduating appliance, the combination of means to support the vessel to be graduated, a scriber to mark the graduation lines on the vessel, means to feed the vessel and scriber relatively to one another to provide the spaces between the lines, means to rotate the scriber and vessel relatively to one another at a variable speed, and means to move the scriber and vessel relatively toward and from one another to control the marking period of the scriber, said means causing such approach when the relative rotation of scriber and vessel is slower than during the marking action of the scriber.

14. In a graduating appliance, the combination of means to support the vessel to be graduated, a scriber to mark the graduation lines on the vessel, means to feed the vessel and scriber relatively to one another to provide the spaces between the lines, means to rotate the scriber and vessel relatively to one another at a variable speed, means to move the scriber and vessel relatively toward and from one another to control the marking period of the scriber, said means causing such approach when the relative rotation of scriber and vessel is slower than during the greater portion of the idle period of the scriber.

15. In a graduating appliance, the combination of means to support the vessel to be graduated, a scriber to mark the graduation lines on the vessel, means to feed the vessel and scriber relatively to one another to provide the spaces between the lines, means to rotate the scriber and vessel relatively to one another at a variable speed, and means to move the scriber and vessel relatively toward and from one another to control the marking period of the scriber, said means causing such recession when such relative rotation of the scriber and vessel is comparatively slow.

16. In a graduating appliance, the combination of means to support the vessel to be graduated, a scriber to mark the graduation lines on the vessel, means to feed the vessel and scriber relatively to one another to provide the spaces between the lines, means to rotate the scriber and vessel relatively to one another at a variable speed, and means to move said scriber and vessel relatively toward and from one another to control the marking period of the scriber, said means causing such recession when the relative rotation of the scriber and vessel is slower than such rotation during the greater portion of the marking action of the scriber.

17. In a graduating appliance, the combination of means to support the vessel to be graduated, a scriber to mark the graduation lines on the vessel, means to feed the vessel and scriber relatively to one another to provide the spaces between the lines, means to rotate the scriber and vessel relatively to one another at a variable speed, and means to move the scriber and vessel relatively toward and from one another to control the marking period of the scriber, said means causing such recession when such relative rotation is slower than it is during the greater portion of the idle period of the scriber.

18. In a multiple graduating machine, the combination of means to support a plurality of vessels to be graduated, scribers for said vessels, means to cause the scribers to mark voluminal graduation lines on said vessel simultaneously, numeral scribers for said vessels, means whereby said numeral scribers may be caused to mark graduation numerals on said vessels simultaneously, means to move said vessels and scribers automatically simultaneously relatively to one another to produce the spaces between the graduation lines, means permitting said vessels and numeral scribers to be moved simultaneously relatively to one another to produce the spaces between the numerals, and means to permit preliminary manual adjustment of said moving means to register the graduation line scribers with spaced initial test volume marks on said vessels, whereby the spaces between the graduation lines and numerals will conform substantially to the irregularities in the internal calibers of the vessels.

19. In a graduating machine, the combination of means to support a vessel to be provided with voluminal graduation numerals, a scriber to mark the numerals on the vessel, a master-marker, an operative connection between said master-marker and said scriber, means to permit said vessel and scriber to be moved relatively to one another to produce the spaces between the graduation numerals, and means to permit preliminary manual adjustment of said moving means to cause said numerals to be spaced apart distances conforming substantially to the variations in the internal caliber of the vessel.

20. In a graduating machine, the combination of means to support a plurality of vessels to be provided with voluminal graduation numerals, scribers to mark the numerals on the vessels simultaneously, a master-marker, operative connections between said master-marker and said scribers, means to permit said vessels and scribers to be moved relatively to one another to produce the spaces between the graduation numerals, and means to permit preliminary manual adjustment of said moving means to cause said numerals to be spaced apart distances which conform substantially to the variations in the internal calibers of the vessels.

21. In a graduating machine, the combination of means to support a plurality of vessels to be provided with voluminal graduation numerals, scribers to mark the numerals on the vessels, means to move the vessels and scribers relatively to one another to provide the spaces between the numerals, a master-marker, and operative connections between said master-marker and said scribers permitting simultaneous application of the numerals to the vessels.

22. In a graduating machine, the combination of means to support a vessel to be provided with a plurality of rows of graduation legends, a scriber to mark the legends on the vessel, a master-marker, an operative connection between said master-marker and scriber, means permitting said vessel and scriber to be moved relatively to one another to provide the spaces between the legends, and means permitting said vessel and scriber to be moved relatively to one another whereby the plurality of rows of legends may be applied.

23. In a graduating machine, the combination of means to support a vessel to be provided with a plurality of rows of graduation numerals, a scriber to mark the numerals on the vessel, a master-marker, an operative connection between said master-marker and said scriber, said support being movable to turn the vessel on its own axis whereby to permit the application of a plurality of rows of numerals, means to permit said vessel and scriber to be moved relatively to one another to produce the spaces between the graduation numerals, and means to permit preliminary manual adjustment of said moving means to cause the numerals of each row to be spaced apart distances conforming substantially to the variations in the internal caliber of the vessel.

24. In a graduating machine, the combination of means to support a plurality of vessels each to be provided with a plurality of rows of voluminal graduation numerals, a scriber for each vessel to mark the numerals thereon, a master-marker, operative connections between said master-marker and said scribers whereby the numerals may be simultaneously applied to all of the vessels, said supports being movable to turn said vessels and scribers relatively to one another to permit the application of the plurality of rows of numerals to each vessel, means to permit said vessels and scribers to be moved relatively to one another to produce the spaces between the numerals, and means to permit preliminary manual adjustment of said moving means whereby to cause said numerals to be spaced apart distances conforming substantially to the variations in the internal calibers of the vessels.

25. In a graduating machine, the combination of means to support a vessel to be provided with spaced voluminal graduation lines and numerals, a scriber to make the graduation lines on said vessel, means to cause the scriber to mark voluminal graduation lines on said vessel, means to move said vessel and scriber automatically relatively to one another to produce the spaces between the graduation lines, a scriber to mark the numerals on the vessel, a master-marker, an operative connection between said master-marker and scriber, means to permit movement of the vessel and scriber relatively to one another to produce the spaces between the graduation numerals, and means to permit preliminary manual adjustment of said moving means to cause said graduation lines and numerals to be spaced apart distances conforming substantially to the variations in the internal caliber of the vessel.

26. In a graduating machine, the combination of means to support a vessel to be provided with a plurality of rows of graduation numerals, a scriber, means to cause said scriber to mark voluminal graduation lines on said vessel, means to move said vessel and scriber automatically relatively to one another to produce the spaces between the graduation lines, a scriber to mark the numerals on the vessel, a master-marker, an operative connection between said master-marker and scriber, means to permit movement of the vessel and scriber relatively to one another to produce the spaces between the graduation numerals, and means to permit preliminary manual adjustment of said moving means to cause said graduation lines and numerals to be spaced apart distances conforming substantially to the variations in the internal caliber of the vessel.

27. In a graduating machine, the combination of means to support a plurality of vessels each to be provided with spaced graduation lines and a plurality of rows of graduation numerals, line scribers, means to cause said scribers to mark the graduation lines on the vessels simultaneously, means to move said vessels and scribers relatively to one another to provide the spaces between the lines, numeral scribers, a master-marker, operative connections between said master-marker and said numeral scribers whereby the vessels may be supplied simultaneously with their numerals in succession, means to permit said vessels and numeral scribers to be moved relatively to one another to provide the spaces between the numerals, means to permit preliminary adjustment of said moving means to cause the spaces between the lines and those between the numerals to conform substantially to the variations in the internal calibers of the vessels, and means to permit said vessels and numeral scribers to be moved relatively to one another to allow the application of a plurality of rows of numerals to each vessel.

In witness whereof I have hereunto set my hand.

HANS N. HALVERSEN.